US011781624B2

(12) United States Patent
Gagnon (10) Patent No.: US 11,781,624 B2
(45) Date of Patent: Oct. 10, 2023

(54) LINEAR ACTUATOR FOR MOTION SIMULATOR

(71) Applicant: D-BOX TECHNOLOGIES INC., Longueuil (CA)

(72) Inventor: Stephan Gagnon, Laval (CA)

(73) Assignee: D-BOX TECHNOLOGIES INC., Longueuil (CA)

( * ) Notice: Subject to any disclaimer, the term of this patent is extended or adjusted under 35 U.S.C. 154(b) by 14 days.

(21) Appl. No.: 17/762,857

(22) PCT Filed: Sep. 23, 2020

(86) PCT No.: PCT/CA2020/051272
§ 371 (c)(1),
(2) Date: Mar. 23, 2022

(87) PCT Pub. No.: WO2021/056103
PCT Pub. Date: Apr. 1, 2021

(65) Prior Publication Data
US 2022/0341485 A1 Oct. 27, 2022

Related U.S. Application Data

(60) Provisional application No. 63/040,939, filed on Jun. 18, 2020, provisional application No. 62/904,191, filed on Sep. 23, 2019.

(51) Int. Cl.
*F16H 25/20* (2006.01)
*A63G 31/02* (2006.01)
*A63J 25/00* (2009.01)

(52) U.S. Cl.
CPC ............. *F16H 25/20* (2013.01); *A63G 31/02* (2013.01); *A63J 25/00* (2013.01); *F16H 2025/2031* (2013.01); *F16H 2025/2075* (2013.01)

(58) Field of Classification Search
CPC ............. F16H 25/20; F16H 2025/2031; F16H 2025/2075; A63G 31/02; A63J 25/00
See application file for complete search history.

(56) References Cited

U.S. PATENT DOCUMENTS 6,113,275 A 9/2000 Blase
9,312,738 B2 * 4/2016 Winther ................... H02K 7/06
(Continued)

FOREIGN PATENT DOCUMENTS

CA 2892246 A1 6/2014

*Primary Examiner* — David M Fenstermacher
(74) *Attorney, Agent, or Firm* — NORTON ROSE FULBRIGHT CANADA LLP (57) ABSTRACT

A linear actuator comprises a motor for producing a bi-directional rotational output. A casing is connected to the motor at a proximal end, the casing having an inner cavity defining a joint surface. A shaft is within the inner cavity of the casing and actuated by the motor for rotation. A sliding tube is at least partially in the inner cavity of the casing for moving in translation in an axial direction relative to the casing. One or more travelling nut is connected to the sliding tube assembly for moving with the sliding tube in the axial direction, the travelling nut being operatively engaged to the shaft for converting a rotational motion of the shaft into a translation of the sliding tube. A liner is between the sliding tube and the joint surface of the inner cavity, an inner surface of the liner defining longitudinal contact surfaces separated by longitudinal grooves, the longitudinal contact surfaces contacting the sliding tube.

16 Claims, 9 Drawing Sheets

(56) References Cited

U.S. PATENT DOCUMENTS

| | | | | |
|---|---|---|---|---|
| 2009/0056497 A1* | 3/2009 | Swinford | ............... | E21B 17/073 |
| | | | | 74/640 |
| 2010/0236342 A1* | 9/2010 | Tseng | ....................... | H02K 7/06 |
| | | | | 74/89 |
| 2015/0316130 A1* | 11/2015 | Rousseau | ................ | F16H 25/20 |
| | | | | 74/89.23 |
| 2015/0316131 A1* | 11/2015 | Rousseau | ................ | H02K 7/06 |
| | | | | 74/89.23 |
| 2015/0316933 A1* | 11/2015 | Masuda | ................... | G05D 3/12 |
| | | | | 310/68 B |
| 2015/0323049 A1* | 11/2015 | Rousseau | ................ | F16C 11/04 |
| | | | | 403/119 |
| 2018/0172122 A1* | 6/2018 | Parmar | ................. | E02F 9/2095 |
| 2018/0208171 A1* | 7/2018 | Smith | ...................... | F16D 65/46 |
| 2019/0040940 A1* | 2/2019 | Matsuto | ................ | F16H 57/021 |
| 2019/0107186 A1* | 4/2019 | Feitl | ......................... | H02K 7/06 |
| 2020/0072329 A1* | 3/2020 | Reichmuth | ............ | B01L 3/0227 |
| 2021/0025483 A1* | 1/2021 | Lawlor | ................. | E04H 4/0006 |
| 2021/0364070 A1* | 11/2021 | Keranen | ............. | F16H 57/0497 |
| 2022/0341485 A1* | 10/2022 | Gagnon | ................... | H02K 7/06 |

\* cited by examiner

LINEAR ACTUATOR FOR MOTION SIMULATOR

CROSS-REFERENCE TO RELATED APPLICATION

The present application claims the priorities of U.S. Patent Application No. 62/904,191, filed on Sep. 23, 2019, and of U.S. Patent Application No. 63/040,939, filed on Jun. 18, 2020, the contents of both of which being incorporated herein by reference.

FIELD OF THE APPLICATION

The present application relates to linear actuators as used with motion simulators or in motion simulation, for instance to displace an occupant or occupants of a platform in synchrony with a sequence of video images or with an audio track, and to linear guides such as the linear actuators, for various uses such as in cinema, video games, simulators, etc.

BACKGROUND OF THE ART

In the video and televised entertainment industry, there is an increasing demand for enhancing the viewing experience of a viewer. Accordingly, there has been numerous innovations to improve the image and the sound of viewings. Motion simulation has also been developed to produce movements of a motion platform (e.g., a seat, a chair) in synchrony with sequences of images of a viewing. For instance, U.S. Pat. Nos. 6,585,515 and 7,934,773 are two examples of systems that have been created to impart motion to a seat, to enhance a viewing experience.

Electro-mechanical linear actuators are commonly used in such motion platforms. These linear actuators must often be capable of producing low and medium amplitude outputs, at low or medium frequency, for a high number of strokes. Moreover, these linear actuators must support a portion of the weight of a platform and its occupant(s).

SUMMARY OF THE APPLICATION

It is therefore an aim of the present disclosure to provide a linear actuator that addresses issues associated with the prior art.

Therefore, in accordance with a first aspect of the present disclosure, there is provided a linear actuator comprising: a motor for producing a bi-directional rotational output; a casing connected to the motor at a proximal end, the casing having an inner cavity defining a joint surface; a shaft within the inner cavity of the casing and actuated by the motor for rotation; a sliding tube at least partially in the inner cavity of the casing for moving in translation in an axial direction relative to the casing; at least one travelling nut or like travelling member connected to the sliding tube assembly for moving with the sliding tube in the axial direction, the travelling nut or like travelling member being operatively engaged to the shaft for converting a rotational motion of the shaft into a translation of the sliding tube; and a liner between the sliding tube and the joint surface of the inner cavity, an inner surface of the liner defining longitudinal contact surfaces separated by longitudinal grooves, the longitudinal contact surfaces contacting the sliding tube.

Further in accordance with the first aspect, for instance, the liner has C-shaped cross section.

Still further in accordance with the first aspect, for instance, at least some of the longitudinal contact surfaces apply a biasing force on the sliding tube.

Still further in accordance with the first aspect, for instance, at least a first set of the longitudinal contact surfaces and a second set of the longitudinal contact surfaces are provided, and wherein, at rest, an inner diameter ID of the liner at the first set of the longitudinal contact surfaces is smaller than an inner diameter ID' of the liner at the second set of the longitudinal contact surfaces, whereby the longitudinal contact surfaces of the first set apply a biasing force on the sliding tube.

Still further in accordance with the first aspect, for instance, the longitudinal contact surfaces of the first set are wider than the longitudinal contact surfaces of the second set.

Still further in accordance with the first aspect, for instance, at least one projecting feature is defined on an outer surface of the liner and is received in a surface depression in the inner cavity for the liner to be blocked from translating along the casing.

Still further in accordance with the first aspect, for instance, at least one projection is defined on an outer surface of the liner and is received in a surface depression in the inner cavity for the liner to be blocked from rotating within the casing.

Still further in accordance with the first aspect, for instance, the at least one projection is an elongated finger, and wherein a guide projects inward from a remainder of the liner for being received in a corresponding slot of the sliding tube for blocking the sliding tube from rotating.

Still further in accordance with the first aspect, for instance, the guide is radially aligned with the at least one projection.

Still further in accordance with the first aspect, for instance, the longitudinal contact surfaces have a coating thereon having a lower friction coefficient than a remainder of the liner.

In accordance with a second aspect of the present disclosure, there is provided a linear actuator comprising: a motor having an output shaft for producing a bi-directional rotational output; a casing connected to the motor at a proximal end, the casing having an inner cavity defining a joint surface; a shaft within the inner cavity of the casing; at least one bearing within the inner cavity and adjacent to the proximal end of the casing; a coupling assembly for coupling the output shaft of the motor to the shaft, the coupling assembly including a shaft support rotatably received in the bearing, with a taper-lock being defined between the shaft and the shaft support; a sliding tube at least partially in the inner cavity of the casing for moving in translation in an axial direction relative to the casing; and at least one travelling nut or like travelling member connected to the sliding tube for moving therewith, the travelling nut or like travelling member being operatively engaged to the shaft for converting a rotational motion of the shaft into a translation of the sliding tube.

Further in accordance with the second aspect, for instance, the shaft has a frusto-conical end surface and the shaft support has a frusto-conical cavity for the taper-lock arrangement.

Still further in accordance with the second aspect, for instance, the shaft support has a cavity in which the output shaft of the motor is received.

Still further in accordance with the second aspect, for instance, the cavity of the shaft support is inside the bearing.

Still further in accordance with the second aspect, for instance, the shaft support has an end flange abutting against the bearing, and a threaded surface, a nut being engaged onto the threaded surface such that the bearing is between the flange and the nut.

Still further in accordance with the second aspect, for instance, a motor coupler is connected to the end of the motor shaft and is received in the cavity of the shaft support, and a joint interface connects the motor coupler with the shaft support.

Still further in accordance with the second aspect, for instance, the joint interface is deformed when between the motor coupler and the shaft support.

Still further in accordance with the second aspect, for instance, the joint interface has a hardness lower than a hardness of the motor coupler and lower than a hardness of the shaft support.

Still further in accordance with the second aspect, for instance, complementary anti-rotation features are defined in the cavity of the support surface and on the joint interface.

Still further in accordance with the second aspect, for instance, a collar may be axially compressed between the motor and the bearing, in the casing.

In accordance with a third aspect of the present disclosure, there is provided a linear actuator comprising: a motor for producing a bi-directional rotational output; a casing connected to the motor at a proximal end, the casing having an inner cavity defining a joint surface; a shaft within the inner cavity of the casing and actuated by the motor for rotation; a sliding tube at least partially in the inner cavity of the casing for moving in translation in an axial direction relative to the casing, the sliding tube having a proximal half and a distal half, the proximal half being closer to the motor than the distal half; at least one travelling nut or like travelling member having a connection portion connected to the sliding tube for moving with the sliding tube in the axial direction, the travelling nut or like travelling member having an operational portion being operatively engaged to the shaft for converting a rotational motion of the shaft into a translation of the sliding tube, wherein the connection portion of the travelling nut or like travelling member is substantially in the distal half of the sliding tube, and the operational portion of the travelling nut or like travelling member is substantially in the proximal half of the sliding tube.

Further in accordance with the third aspect, for instance, the connection portion of the travelling nut or like travelling member is in threaded engagement with the sliding tube.

Still further in accordance with the third aspect, for instance, the operational portion of the travelling nut or like travelling member is a ball screw unit.

Still further in accordance with the first, second and third aspect, for instance, a maximum amplitude of movement of the sliding tube relative to the casing is up between 140 mm and 152 mm.

Still further in accordance with the first, second and third aspect, for instance, the inner cavity of the casing has a the inner cavity 42 of the casing 40 has a length of about 274 mm±10 mm.

Still further in accordance with the first, second and third aspect, for instance, a ratio of casing length to sliding tube diameter ranges between 3.3 and 4.1.

DESCRIPTION OF THE PREFERRED EMBODIMENTS

Figure 1:
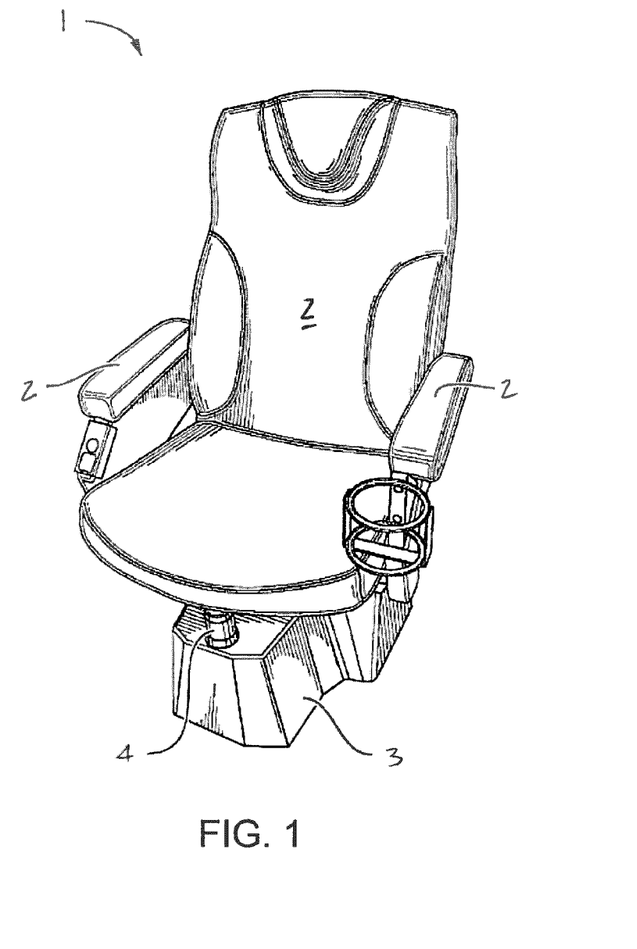
FIG. 1 is a perspective view of a motion simulator having one or more linear actuators in accordance with the present disclosure.

Referring to drawings and, more particularly, to FIG. 1, there is illustrated a motion simulator at 1. The motion simulator 1 is of the type that may receive actuation signals from a controller so as to move an output thereof in accordance with a set of movements, and perform vibrokinetic effects at the output. For example, the motion simulator 1 may be of the type that moves in synchronicity with video or audio output, with motion signals representative of movements to be performed being received from a controller. In the illustrated embodiment, the motion simulator 1 has a motion platform 2 supporting one or more occupants exposed to movements of the motion simulator 1. In the illustrated embodiment, the motion platform 2 is a seat having a seat portion in which a user may be seated. Other occupant supporting structures may be included, but for simplicity the expression seat portion 2 will be used in the present application.

The seat portion 2 is shown as having armrests, a seat, and a backrest and this is one of numerous configurations considered, as the seat portion 11 could be for a single user, multiple users, may be a bench, a cockpit, etc. The motion simulator 1 also has an actuation system 3 by which the output, namely the seat portion 2, is supported to the ground. The actuation system 3 is shown as having a casing hiding its various components, although an actuated leg 4 is partly visible. The actuation system may have one or more of these actuated legs 4, supporting the output, i.e., the seat portion 2, from the ground. In an embodiment, one or more of the actuated legs 4 includes a linear actuator of the type shown at 10 in FIGS. 2-4. For example, the motion simulator 1 may support a platform, cockpit or structure instead of a seat portion, in a flight simulator embodiment, a cabin in a vehicle simulator embodiment or an end effector in the case of a parallel manipulator or like robotic application.

Figure 2:
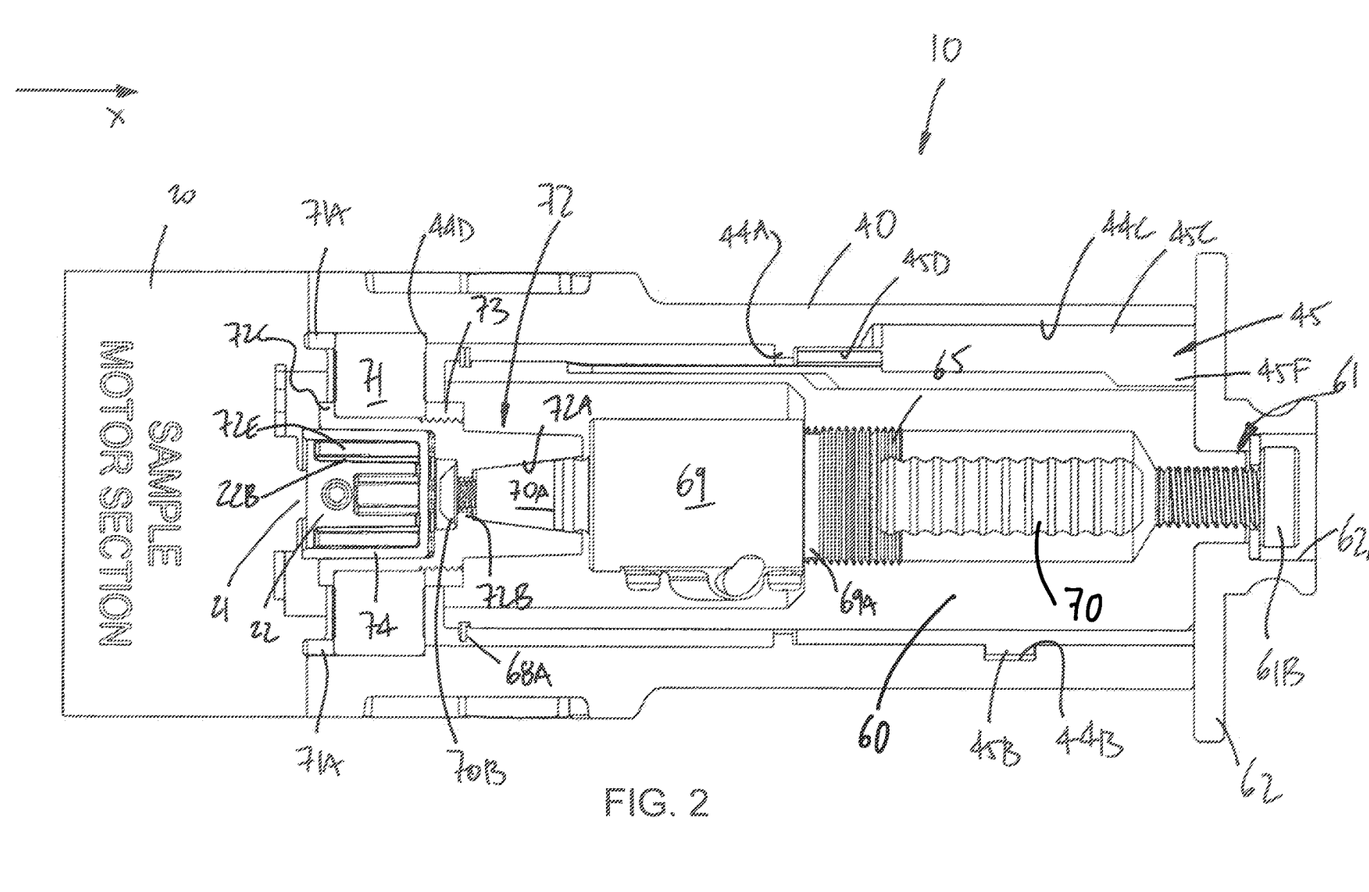
FIG. 2 is a see-through longitudinal view of a linear actuator for motion simulators in accordance with the present disclosure.

Referring to the drawings and more particularly to FIGS. 2, there is illustrated at 10 a linear actuator of the type used for motion simulators. However, some groups and/or components described herein may also apply to other linear guides such as guiding shafts or guide rods. The linear actuator 10 is well suited to be used between the ground and a motion platform (i.e., support surface, chair, seat, flight simulator/compartment, etc) to displace the motion platform in synchrony with a sequence of images and/or sound, for instance part of a motion picture, a televised event, a video, a video game, a simulation, haptic event, a virtual reality session, etc. The linear actuator 10 of the illustrated embodiments is an electro-mechanical linear actuator that is driven by a motion controller, or any other appropriate and adapted source of motion signals (e.g., media player, D-cinema projector, internet, etc), i.e., code representing specific motions to be performed. The motion signal is sent to the linear actuator 10 in a suitable format to drive a motor thereof. In an embodiment, at least two of the actuator 10 are used concurrently to support and displace a seat relative to the ground. The linear actuator 10 therefore produces a translational output, along an axial direction thereof, illustrated as X. When reference is made hereinafter to the axial direction, it will refer to the longitudinal axis of the linear actuator 10, unless stated otherwise, and is shown as X in FIG. 2-4.

The linear actuator 10 may be regarded as an assembly of three groups (i.e., three portions, three sub-assemblies, etc), namely a motor group 12, a structural group 14 and a driven group 16, though other arrangements are contemplated. The groups 12, 14 and 16 are divided as such to facilitate the description, but components of one group may be part of another group, may be shared between groups, etc. The motor group 12 and the structural group 14 are only schematically illustrated and briefly detailed, as the details of the present disclosure mostly pertain to the driven group 16. However, for reference, PCT application no. PCT/US2013/072605 describes one example of a motor group 12 and of a structural group 14, and is hence incorporated by reference.

The motor group 12 receives motion signals in electric format, and produces rotational motions corresponding to the motion signals received. The motor group 12 is therefore connected to a source of motion signals or like electronic equipment. The motor group 12 is operatively connected to the driven group 16 to transmit its rotational motions thereto.

The structural group 14 houses the driven group 16, and operatively connects the motor group 12 to the driven group 16. Moreover, the structural group 14 may be the interface between the linear actuator 10 and the motion platform, the ground, or a supporting structure.

The driven group 16 converts the rotational motions from the motor group 12 into linear motions along direction X, and is the output of the linear actuator 10. The driven group 16 may be the interface between the linear actuator 10 and the ground or a base, and is displaceable relative to the structural group 14.

MOTOR GROUP 12

Figure 3:
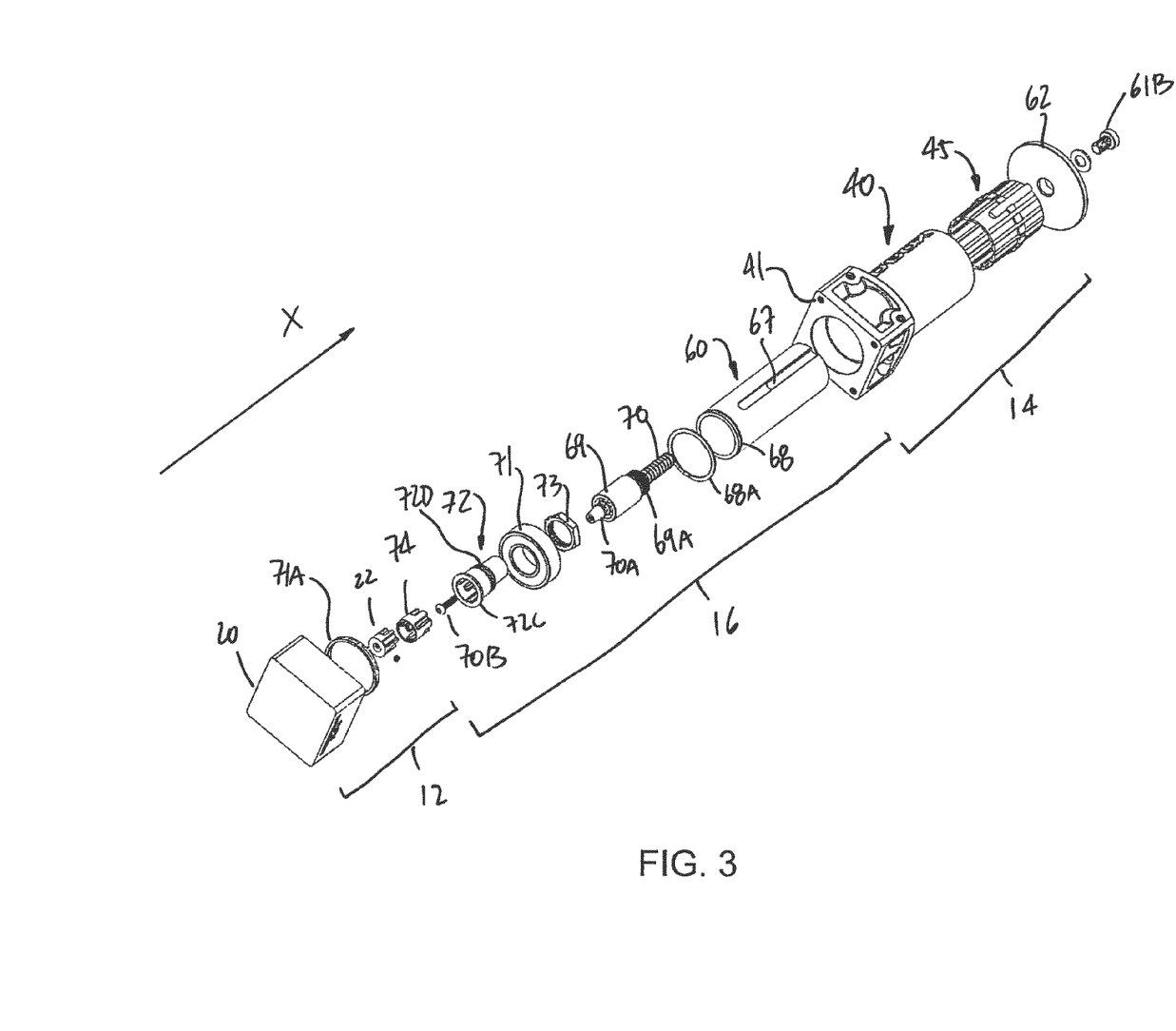
FIG. 3 is a first exploded view of the linear actuator for motion simulators of FIG. 2.
Figure 4:
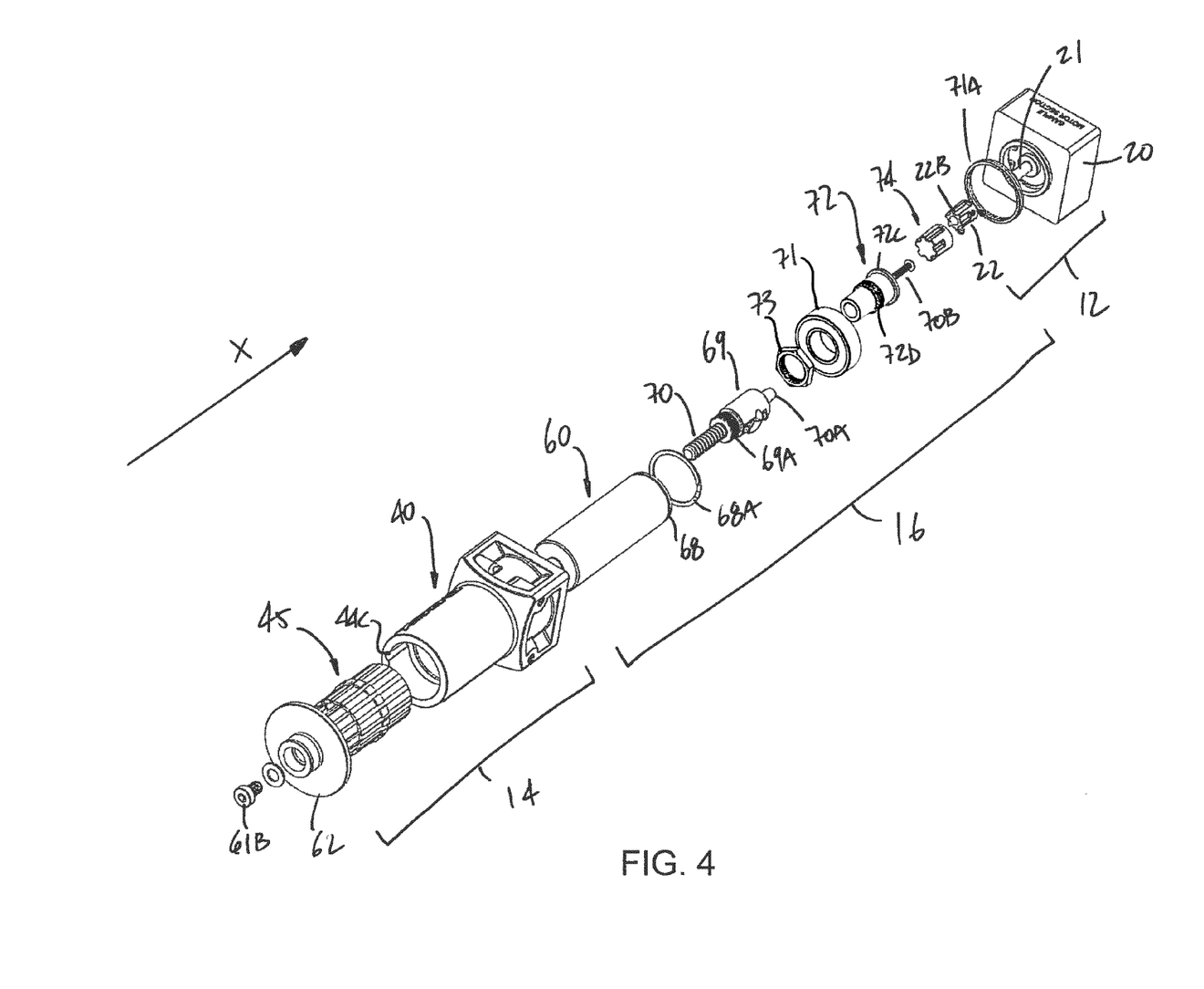
FIG. 4 is a second exploded view of the linear actuator for motion simulators of FIG. 2.

Referring to FIGS. 2 to 4, a few components of the motor group 12 are shown in greater detail. For simplicity purposes, components of the motor group 12 are numbered in the 20s.

The motor group 12 has an electric motor 20. The electric motor 20 is a bi-directional motor of the type receiving an electrical motion signal, to convert the signal in a rotational output proportional to the motion signal, in either circular directions, in direct drive. A transmission could be present as well, such as a reduction gear box, a planetary gear system, etc. In a direct drive arrangement, the electric motor 20 has an output shaft 21 in FIG. 2. By way of example, the electric motor 20 is a brushless DC motor. This type of electric motor is provided as an example, and any other appropriate type of motor may be used. The output shaft 21 may project in the axial direction X, but rotates about X. A coupling component 22 in FIG. 2 (e.g., a motor coupler) is connected to the output shaft 21 so as to be integral therewith (e.g., by way of a set screw, etc). Hence, the motor coupler 22 rotates with the output shaft 21. The motor coupler 22 will be coupled to the driven group 16 as described hereinafter, or may alternatively be part of the driven group 16. For instance, the coupler 22 has one or more axial grooves 22B as a possible configuration.

A body of the motor 20 may be connected in any appropriate way to the structural group 14. For example, the body may have a connection flange, bolt or screw holes, connection surfaces, threads, etc. A connection flange could for instance use appropriate fasteners such as bolts (not shown), washers, and the like to connect the motor 20 to the structural group 14. Any appropriate type of connection means may be used to secure the body of the motor 20 to the structural group 14.

STRUCTURAL GROUP 14

Referring to FIGS. 2 to 4, components of the structural group 14 are shown in greater detail. For simplicity purposes, components of the structural group 14 are numbered in the 40s.

The structural group 14 comprises a casing 40, also known as a cover, housing, or the like. In the illustrated embodiment, the casing 40 is a monolithic piece, though it may also be composed of separate interconnected pieces. The casing 40 is a main structural component of the linear actuator 10, as it interfaces the motor group 12 to the driven group 16, and may also interface the linear actuator 10 to a motion platform. The casing 40 may have a flange located at a proximal end of the casing 40, for connection with the flange body of the motor group 12, if present. This is an example among others. Other examples include bores 41 (e.g., threaded bores) for receiving fasteners that will be threadingly engaged in bores of the body of the motor 20.

Figure 5:
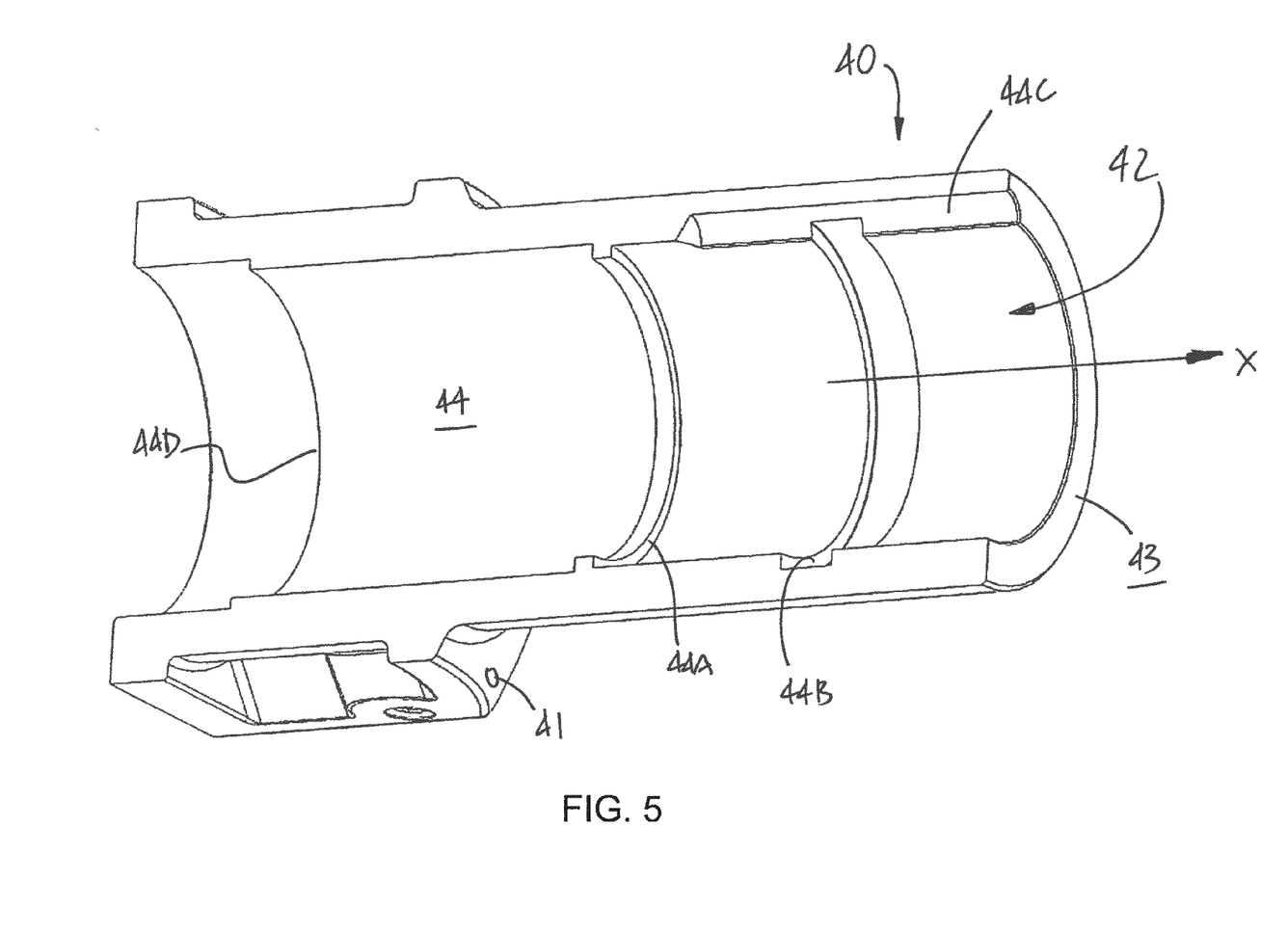
FIG. 5 is a perspective sectioned view of a casing of the linear actuator for motion simulators of FIG. 2.

Referring to FIGS. 2 to 5, the casing 40 is a tubular component that defines an inner cavity 42 that houses a part of the driven group 16. The inner cavity 42 may be segmented in various sections. One such section is delimited by a joint surface 44, which opens up to an open distal end 43 of the casing 40. The joint surface 44 is the surface against which a moving component of the driven group 16 will slide, whether through direct contact or via an interface. A portion of the driven group 16 will exit through the open distal end 43, when expanding in direction X. As shown in FIGS. 2 and 5, the joint surface 44 may have different surface features, such as an annular stopper 44A, an annular groove 44B, and/or a longitudinal slot 44C, i.e., any one of these surface depression features may be present alone or in any combination thereof. These surface features may be integrally part of the casing 40 (e.g., cast or machined directly in the casing 40), or may be add-on features. For example, a circlip or like annular ring may be used as an alternative to the annular stopper 44A.

There may be other sections to the casing 40, such as a void in which components of the driven group 16 may move without obstructions. Another section may be defined by a seat 44D (a.k.a., shoulder) for a bearing of the driven group 16, as described hereinafter. The seat 44D may be in the shape of a counterbore. Alternatively, the seat 44D may be a circlip or like annular ring received in an annular groove in the joint surface 44, as a possibility among others.

Referring to FIGS. 2-4 and 6A-6B, it is also considered to position a piston liner 45 (a.k.a., a sleeve, a bushing, a bushing sleeve) into the joint surface 44 to act as an interface for a sliding component of the driven group 16, as described hereinafter. The liner 45 is well suited to be used in other linear guides such as guiding shafts or guide rods. The liner 45 may consist of a material having a relatively high hardness for a relatively low coefficient of friction, such as a POM (acetal) and PTFE blend. This type of resin is provided as an example, and other appropriate low friction materials could also be used such as resins, metallic, non-metallic, compounded or not materials. The liner 45 may have a monolithic or monoblock construction in an embodiment.

Figure 6A:
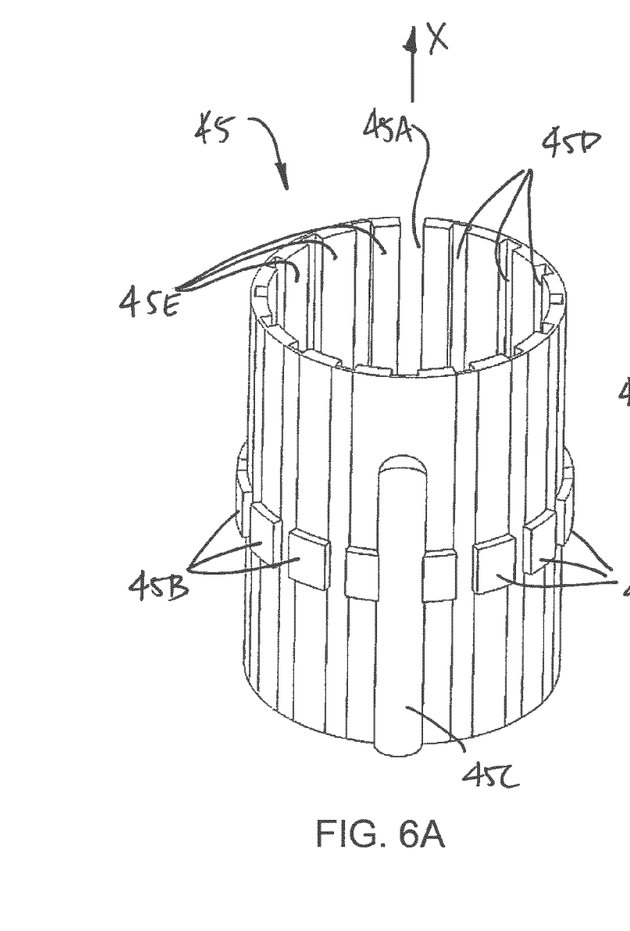
FIG. 6A is a first perspective view of a piston liner of the linear actuator for motion simulators of FIG. 2.
Figure 6B:
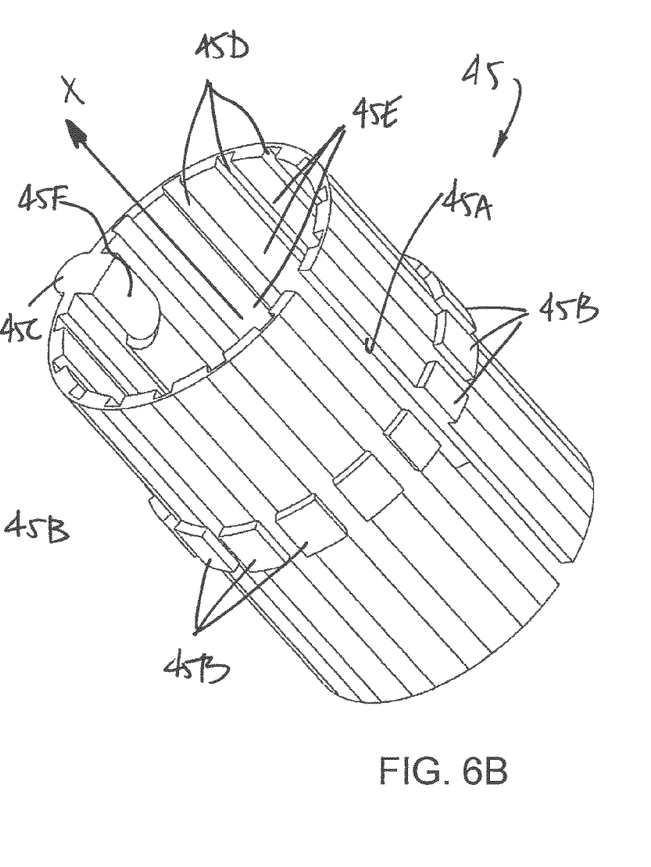
FIG. 6B is a first perspective view of a piston liner of the linear actuator for motion simulators of FIG. 2.

The liner 45 may have the shape of an open cylinder, though it may not be a complete cylinder with a side slot 45A shown. Stated differently, a cross-section of the liner 45 may be C-shaped as opposed to a full circle, though a full circle is considered as well. As facilitated by the side slot 45A if present, the liner 45 may be deformed to be squeezed and inserted inside the casing 40, and against the joint surface 44. The deformation may for instance be an elastic deformation. When the liner 45 regains its shape, it may be complementarily engaged with the surface features of the joint surface 44. Stated differently, the liner 45 may be naturally biased into engagement with the casing 40. In an embodiment, this complementary engagement may not require any additional parts, adhesives, fasteners. The complementary engagement may involve a length of the liner 45 being such that it rests in close proximity to or in contact with the annular stopper 44A, such that it is blocked in direction X toward the motor 20. The complementary engagement may alternatively or additionally include tabs 45B, or like projection(s) or an annular ring on an outer surface of the liner 45, for being engaged in the annular groove 44B or other surface depression of the joint surface 44 of the casing 40. This may also block the liner 45 from moving in direction X, i.e., an axial block. The complementary engagement may alternatively or additionally include finger 45C, or like projection or projecting feature (e.g., tab or tabs) on an outer surface of the liner 45, for being engaged in the longitudinal slot 44C of the joint surface 44 of the casing 40. The engagement of the finger 45C in the slot 44C may block the liner 45 from rotating about an axis parallel to direction X, i.e., a rotational block. Therefore, one or more of 44A, pair 44B/45B and pair 44C/45C may ensure that the liner 45 remains generally fixed in the casing 40.

Referring to FIGS. 6A and 6B, according to an embodiment, the liner 45 has an accordion like body that results in a plurality of longitudinal grooves 45D in an inner surface of the liner 45. Stated differently, a cross-section of the liner 45 would display inwardly facing crenellations. Consequently, these longitudinal grooves 45D are intercalated by longitudinal contact surfaces 45E, against which longitudinal contact surfaces 45E a piston of the driven group 16 will slide as described below. The presence of the longitudinal grooves 45D may reduce a contact area between the liner 45 and the piston by alternating with the longitudinal grooves 45D, and this may reduce frictional forces. The longitudinal grooves 45D may also facilitate the deformation of the liner 45 when inserted in the casing 40. Accordingly, the presence of the grooves 45D may facilitate the assembly.

Still referring to FIGS. 6A and 6B, a guide 45F may project radially inwardly. The guide 45F may serve as guide for a sliding component of the driven group 16, to ensure linear motion, i.e., to serve as an anti-rotation guide for the sliding component of the driven group 16. Moreover, the guide 45F may act as a stopper to delimit the stroke of the linear actuator 10. In the illustrated embodiment, the guide 45F is an inward projection of the finger 45C, such that the guide 45F is aligned with the longitudinal slot 44C. The guide 45F may be separate from the finger 45C as well. The combined thicknesses of the finger 45C and guide 45F may contribute to the stiffness of these features to prevent rotation of a piston of the driven group 16. Alternatives may include blocks used as guides, or the use of the longitudinal grooves 45D to prevent rotation. In an embodiment, axial guidance and rotation blocking are achieved by the sole action of the liner 45 cooperating with the joint surface 44 and the piston of the driven group 16. A ventilation hole may also be defined in the casing 40, to allow air to escape from the interior of the linear actuator 10. The ventilation hole may be protected by a filter or screen.

Figure 6C:
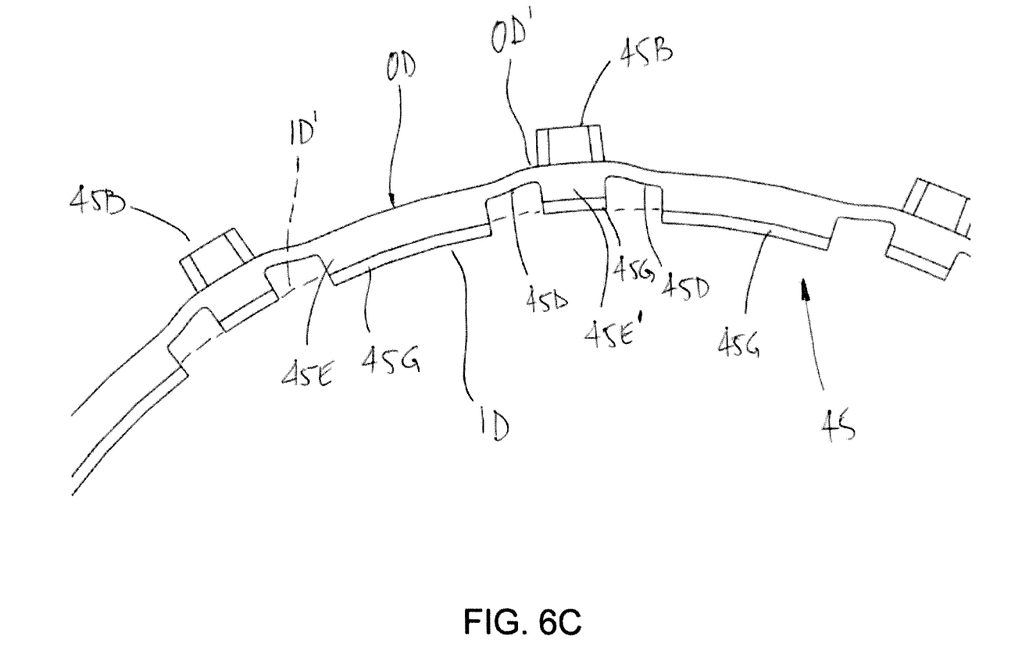
FIG. 6C is an end view of an embodiment of the piston liner of the linear actuator for motion simulators of FIG. 2.

Referring to FIG. 6C, an end view of the liner 45 is shown, with additional optional features, in an embodiment that may differ from the embodiment of FIGS. 6A and 6B. The longitudinal contact surfaces 45E, against which a piston of the driven group 16 will slide as described below, may also be made of a low-friction material such as a POM (acetal) and PTFE blend. This type of resin is provided as an example, and other appropriate low friction materials could also be used such as resins, metallic, nonmetallic, compounded or not materials, in a monoblock construction. However, low-friction pads 45G may also be used to contact the piston, and are hence illustrated. In an embodiment, the pads 45G may be in the form of a coating on the surfaces 45E, such as a PTFE coating, having a lower friction coefficient than a remainder of the liner 45.

In FIG. 6C, it is observed that the longitudinal grooves 45D are paired in closer proximity to define a set of narrower longitudinal surfaces 45E' relative to a set of wider longitudinal surfaces 45E. It is also observed that the outer diameter OD' of the liner 45 at the narrower longitudinal surfaces 45E' is greater than the OD at the wider longitudinal contact surfaces 45E—the diameters being relative to a central axis of the liner 45. Concurrently, an inner diameter ID of the liner 45 at the wider longitudinal contact surfaces 45E is less than the ID' at the narrower longitudinal surfaces 45E'. In an embodiment, the inner diameter ID of the liner 45 at the wider longitudinal contact surfaces 45E is less than an outer diameter of the piston applied against the liner 45, such that a biasing force is applied by the liner 45 on the piston. These diameters may be said to be at rest, i.e., before the liner 45 is in contact with a sliding tube, or prior to being installed in the casing 40, or as molded or manufactured. The thinner wall thickness of the liner 45 at the longitudinal grooves 45D may result in a spring wall being formed. The outer diameter OD is less than an inner diameter of the joint surface 44 of the casing 40, such that a gap may be present between OD and the joint surface 44 to define some play. The springing effect enabled by the configuration described above, with the play between the OD sections of the liner 45 and the joint surface 44, allows the liner 45 to interface the casing 40 to the piston tightly, in spite of dimensional tolerances that could otherwise permit some looseness. Consequently, the springing effect of the spring wall configuration enables larger fabrication tolerances for the casing 40 and/or the piston described below. In some instances, a machining was required to ensure that the bushing were of the appropriate diameter, and this may not be required because of the springing effect. In an embodiment, the springing effect remains in the elastic deformation range of the material used. In another embodiment, a different material is used for a body of the liner 45 in contrast to that of the pads or surfaces 45G, to enable suitable springing effect. However, the monoblock construction of the liner 45 has suitable springing effect on its own.

A connection flange may be secured to the distal end of the casing 40, and may be provided with connection throughbores, etc, to be secured to a structure, to a motion platform, etc. The connection flange is one of multiple connection arrangements for the linear actuator 10.

The above details regarding the motor group 12 and the structural group 14 are given as exemplary embodiments.

DRIVEN GROUP 16

Referring to FIGS. 2 to 4, components of the driven group 16 are shown in greater detail. For simplicity purposes, components of the driven group 16 are numbered in the 60s and 70s.

The driven group 16 has a sliding tube 60, also known as a piston. The sliding tube 60 is the main moving component of the driven group. The sliding tube 60 is fitted within the inner cavity 42 of the casing 40, and hence may have a shape complementary to that of the inner cavity 42. For instance, the sliding tube 60 may be a generally cylindrical tube, though with outer surface features disrupting an otherwise circular cross-section. Any other appropriate cross-section is contemplated, such as oval, polygonal, hybrid (e.g., squircle), all of which are given as examples. The sliding tube 60 may be sized so as to be in sliding contact with the piston liner 45 on the joint surface 44, if the liner 45 is present. Hence, the sliding tube 60 may move in the axial direction X in the inner cavity 42 of the casing 40, such that a distal end of the sliding tube 60 may project out of the distal end of the casing 40 by a variable distance. For instance, in FIG. 2, the sliding tube 60 is retracted within the casing 40 in a retracted condition of the linear actuator 10. The sliding tube 60 may extend out of the casing 40, in an extended condition of the linear actuator 10. This may be referred to as a telescopic movement, as a translational degree of freedom, etc. In an embodiment, the sliding tube 60 is constrained to moving only in one translational degree of freedom, though it is possible that some slight play may be permissible, or not.

In the illustrated embodiment, an interface 61 is provided at a distal end of the sliding tube 60, outside of the casing 40. The interface 61 is in the form of an end tube 61A with threading (FIG. 7), for screwingly engaging a fastener 61B. In an embodiment, the sliding tube 60 has a monolithic construction, though this is only optional. Moreover, the interface 61 could take other forms as well, for instance by being a central threaded hole or circumferential threaded holes, without the projecting end tube, or may also be a threaded projection, as a possibility among numerous others. The interface 61 may be a ground or base interface if the linear actuator 10 is oriented with the interface 61 downward. For instance, the interface 61 may lie directly on the ground, or be a part of a joint. For example, an exemplary joint that may be at the end of the interface 61 is described in PCT/CA2018/050381 or in PCT/US2016/059696, both of which are incorporated herein by reference. Such a joint at the end of the linear actuator 10 may reduce stresses and strains to which the linear actuator 10 is exposed at its interface with the ground or to a base. Such a joint may allow multiple degrees of freedom between the linear actuator 10 and the ground, if desired, though this is also optional.

The interface 61 is shown in the figures as having a cap 62 in FIGS. 2-4. A bore 62A is located in the center of the cap 62, such that the cap 62 may be fastened to the sliding tube 60 by the fastener 61B such as a bolt or shaft. The cap 62 is one solution among many others that can be used to connect to the interface 61 at the end of the sliding tube 60. Other configurations include a hemi-spherical or frusto-spherical surface at the interface 61.

Figure 7:
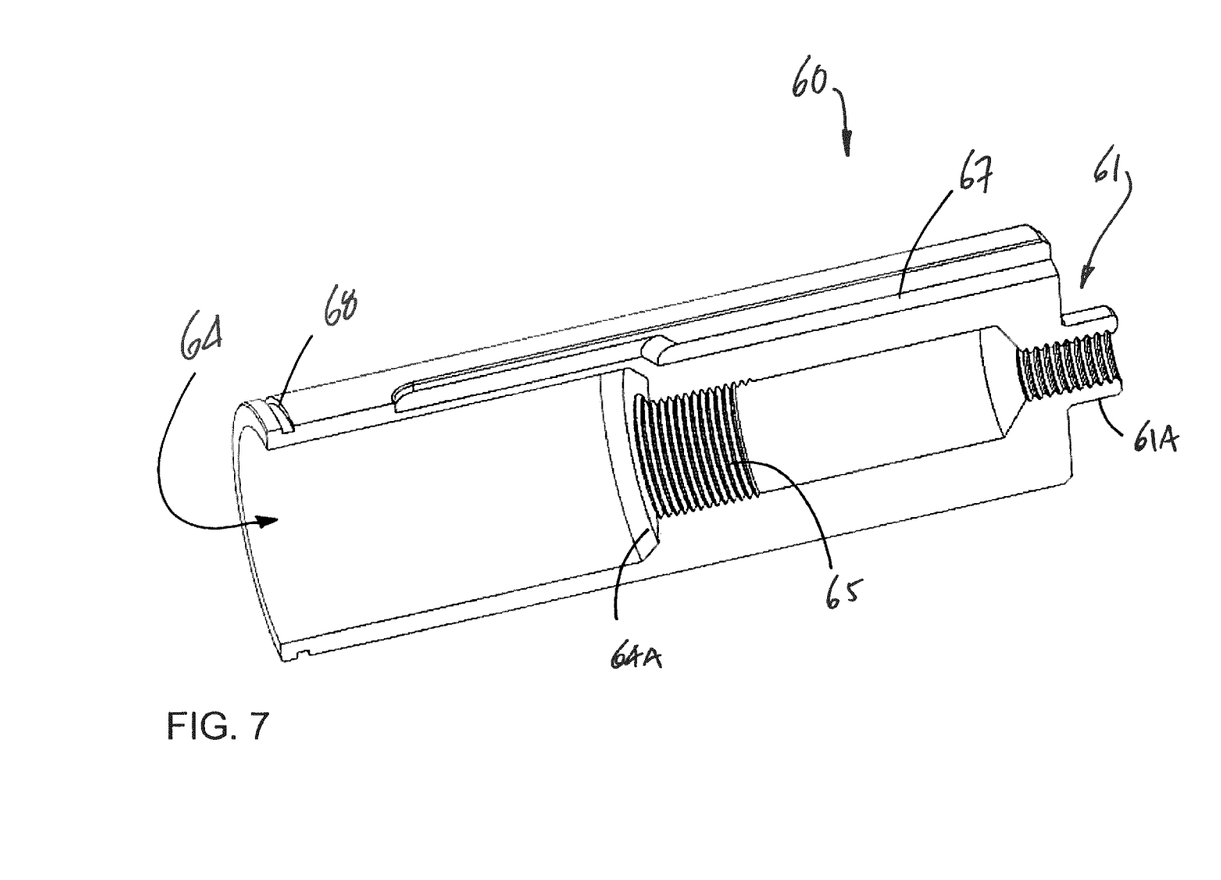
FIG. 7 is a perspective sectioned view of a casing of the linear actuator for motion simulators of FIG. 2.

In the illustrated embodiment, as well shown in FIG. 7, the sliding tube 60 has an inner cavity 64 with a shoulder 64A to provide axial abutment for a travelling nut. Referring to FIGS. 2-4, the inner cavity 64 is shown as extending the full length of the sliding tube 60. The shoulder 64A may lie in a transverse plane relative to the axial direction. Threading 65 may be provided on a surface of the inner cavity 64 adjacent to the shoulder 64A, for threading engagement of the travelling nut.

On an outer surface of the sliding tube 60, a guide channel 67 may be formed. The guide channel 67 is parallel to the axial direction. In operation, the guide 45F of the liner 45 (FIGS. 6A-6C) or equivalent is received in the guide channel 67. In the illustrated embodiment, the sliding tube 60 features a single guide channel 67, but a pair or more of the guide channels 67 may optionally present. However, more or less of the guide channels 67 could be used, with a corresponding number of the guides 45. In an embodiment, the guide channel 67 opens to a distal end of the sliding tube 67, to allow penetration or exit of the guide 45F through the open distal end, when the sliding tube 60 is assembled or disassembled from the casing 40 with liner 45. An annular groove 68 may be defined on an outer surface of the sliding tube 60, for receiving a circlip 68A or like ring that may serve as a stop, when coming into contact with the annular stopper 44A, for example.

Referring to FIGS. 2-4, a travelling nut 69 is secured to the sliding tube 60. In the illustrated embodiment, the travelling nut 69 has connection portion embodied for example by a threaded end 69A (or splined coupling, or nut, or through pin) by which it is connected to the threading 65 of the sliding tube 60, so as to move integrally with the sliding tube 60. The expression "travelling nut 69" refers to a device that is in operational engagement with a shaft, for instance to convert a rotation of the shaft into a translational movement. For instance, a screwing engagement may be possible, or ball screw units are also contemplated—the travelling nut may be viewed as a travelling member, or translating member, etc. It is observed that the threading engagement between the threaded end 69A and the threading 65 is located at least partially in a distal half of the sliding tube 60, if not substantially or completely in the distal half. This engagement location in proximity to the distal end of the sliding tube 60 (i.e., the output end) may enhance the guiding effect and/or reduce deflections at the output end. This engagement location of the travelling nut 69 may be blocked by abutment with the shoulder 64A. In parallel, an operational portion incorporating the operational components of the travelling nut 69, e.g., balls, are located relatively proximal to the connection between the travelling nut 69—via threaded end 69A—and the threading 65 of the sliding tube 60. It may be said that operational components of the travelling nut 69, e.g., balls, are located at least partially in a proximal half of the sliding tube 60, if not substantially or completely in the proximal half, i.e., the half closer to the motor 22.

The travelling nut 69 may be any appropriate type of mechanism operating with a lead screw (i.e., threaded shaft) to convert a rotation of the lead screw into a translation of the sliding tube 60. For instance, the travelling nut 69 is a ball screw unit. One suitable ball screw unit is a NSK rolled ball screw with a return tube for balls (i.e., the operational components), such as a RNCT type ball nut. However, many other types of travelling nuts 69 are considered as alternatives to rolled ball screws. Moreover, the nut 69 may be a monolithic part of the sliding tube 60.

Referring concurrently to FIGS. 2 to 4, a shaft 70 (e.g., threaded shaft, lead screw, bolt) is in operative engagement with the travelling nut 69. The threaded shaft 70 is coupled to the electric motor 20, to transmit the rotational output of the motor 20 to the sliding tube 60. In an embodiment, the threaded shaft 70 may have a helical raceway that is compatible with the travelling nut 69. As the travelling nut 69 is fixed to the sliding tube 60, and as the sliding tube 60 is limited to translational movements due to the interaction between the guide 45F and the guide channel 67, a rotation of the threaded shaft 70 results in a translation of the sliding tube 60 via the travelling nut 69. The threaded shaft 70 may have a conical or frusto-conical end 70A for engagement with a coupler, in a taper coupling arrangement. The conical or frusto-conical end 70A may be monolithic with a remainder of the threaded shaft 70 in an embodiment. The frusto-conical end 70A may have a threaded bore for receiving a fastener 70B. Other arrangements are also contemplated.

The threaded shaft 70 is rotatably connected to the casing 40 by a bearing 71, to rotate about its longitudinal axis (substantially parallel to the axial direction X), while being retained from translating. The bearing 71 may be seated against the seat 44D in the casing 40. A collar 71A may help motor alignment during assembly. The collar 71A may be compressed axially, when the motor 20 is secured to the casing 40, in order to secure the bearing 71 without damaging it. Stated differently, the collar 71A is slid into abutment with the bearing 71, in contrast to being threadlingly engaged for example. The collar 71A would then deform when applying a pressure on the bearing 71. The collar 71A is thus selected with a lesser hardness than the outer ring of the bearing 71. The bearing 71 may therefore be held captive between the seat 44D and the motor 20 via the collar 71A. The bearing 71 may be a ball bearing, a roller bearing, a ball-less bearing, or any appropriate type of bearing.

Referring to FIGS. 2-4 and 8, a shaft support 72 interconnects the shaft 70 to the bearing 71. In the illustrated embodiment, the shaft support 72 is a monolithic piece of metal that is cast, molded and/or machined. Other materials may be used. The shaft support 72 has a tubular body that receives a proximal end of the shaft 70, i.e., the frusto-conical end 70A. For example, the shaft support 72 has a frusto-conical or conical cavity 72A (FIG. 2) having complementary dimensions to the frusto-conical end 70A. The shaft support 72 is fixed to the shaft 70, for instance by the fastener 70B engaged through a bore of an end wall 72B of the frusto-conical cavity 72A. A tightening of the fastener 70B exerts a pull on the frusto-conical end 70A. As the frusto-conical end 70A is against the frusto-conical cavity 72A, rotation between the shaft 70 and the shaft support 72 is blocked, by frictional forces between the frusto-conical end 70A and the frusto-conical cavity 72A. This may be regarded as a taper-lock arrangement between the shaft 70 and the shaft support 72. Other connection arrangements are considered as well, such as splined coupling, keyway and key, etc. It is also considered to reverse the orientation of the taper-lock arrangement, for instance with the shaft support 72 defining the frusto-conical end and the shaft 70 having the frusto-conical cavity.

The shaft support 72 may have a proximal flange 72C and threading 72D. A lock ring or lock nut 73 may therefore be screwed onto the threading 72D. The shaft support 72 may have an outer diameter corresponding to the inner diameter of the bearing 71, for the bearing 71 to be mounted thereon and held captive between the flange 72C and the lock nut 73. The dimensioning of the shaft support 72 may be selected so as to reach an appropriate fit with the bearing 71 (e.g., interference fit, force fit), to reduce or remove any play between the bearing 71 and the shaft support 72.

Figure 8:
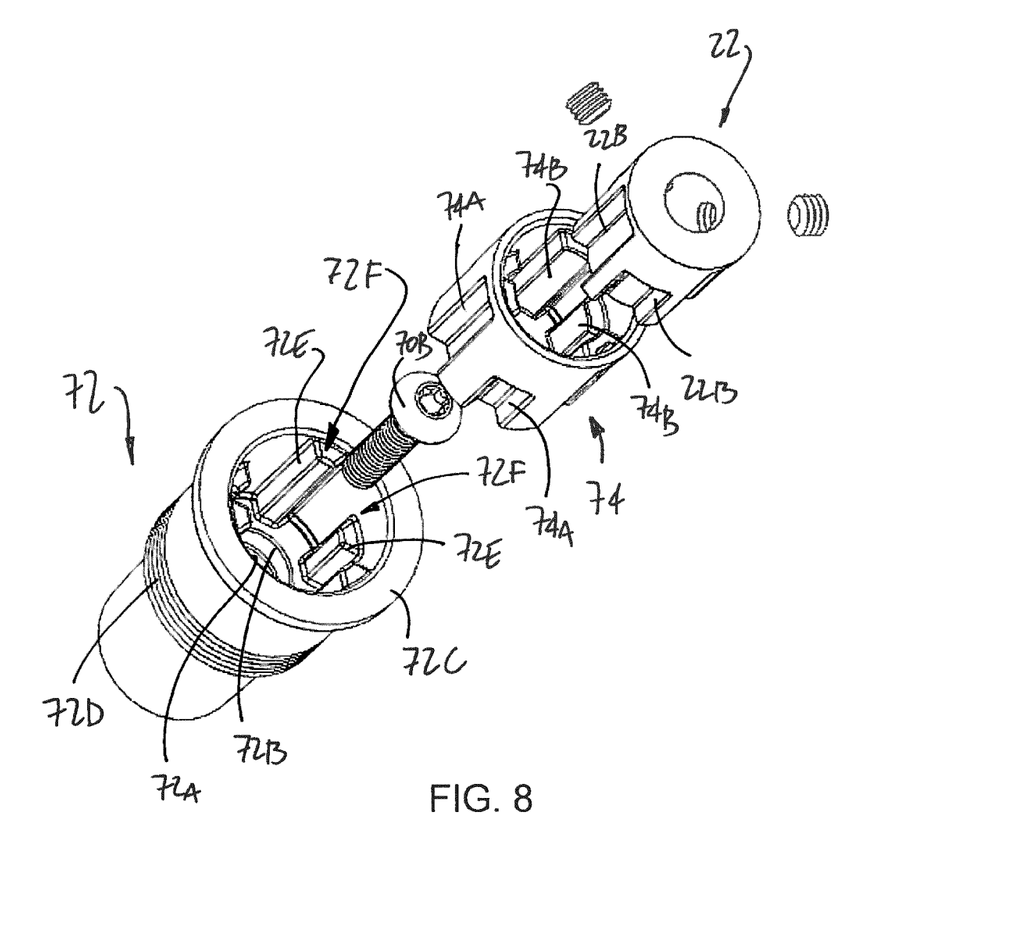
FIG. 8 is an assembly view of a shaft support, a joint interface and a motor coupling of the linear actuator for motion simulators of FIG. 2.

As shown in FIG. 8, fingers 72E may also be provided in an inner cavity 72F of the shaft support 72. The fingers 72E are a coupling component among other anti-rotation features (with friction being an alternative means for blocking rotation between the shaft support 72 and a joint interface 74) by which the shaft 70 and shaft support 72 will be coupled to the motor coupler 22 of the motor 20, for transmission of a rotational output from the electric motor 20 to the shaft 70. The fingers 72E may extend longitudinally, though other orientations are possible as well. Moreover, a single one of the fingers 72E may suffice. One or more of the fingers 72E may be longer than the others as a possibility, for proper indexing of a joint interface to the shaft support 72.

A joint interface 74 may be positioned between the motor coupler 22 and the surface of the inner cavity 72F. The joint interface 74 may be a sleeve or end cap that has an outer surface complementary to the surface of the inner cavity 72F. For example, the joint interface 74 may have grooves 74A for accommodating the fingers 72E of the shaft coupler 72. Additionally or alternatively, the joint interface 74 may have an inner surface complementary to the motor coupler 22, forming complementary anti-rotation features. For example, the joint interface 74 may have fingers 74B for being received in grooves 22B of the motor coupler 22. The fingers 74B may be an imprint (negative) of the grooves 74A in an embodiment.

The joint interface 74 is sized so as to minimize or prevent any play between the motor coupler 22 and the shaft support 72. In an embodiment, the joint interface 74 is squeezed between the motor coupler 22 and the shaft support 72. The joint interface 74 may be made of a relatively hard material, yet with a hardness lower than that of the metallic material used for the motor coupler 22 and the shaft support 72. For instance, the joint interface 74 is made of a high-density polymeric material of Duro 90 hardness. When the linear actuator 10 is assembled in the manner shown in FIG. 2, the joint interface 74 is held captive in the inner cavity 72F of the shaft support 72. Due to its lower hardness relative to the motor coupler 22 and shaft support 72, the joint interface 74 may allow some freedom of alignment between the motor coupler 22 and the shaft support 72, for instance if the output shaft 21 of the motor 20 and the threaded shaft 70 are not perfectly aligned. The joint interface 74 may even deform from its original shape when interfacing the motor coupler 22 to the shaft support 74. Hence, the joint interface 74 forms a universal-like joint between the motor coupler 22 and the shaft support 72. The coupling assembly described above is one of numerous configurations considered for coupling the shafts 21 and 70. For instance, keyways and keys may be used. The arrangement described above may be qualified as splined arrangements, between the shaft support 72 and the joint interface 74, and between the motor coupler 22 and the joint interface 74 as well. Other arrangements may rely on set screws instead of splined arrangements.

As best seen in FIG. 2, the bearing 71 is aligned with the coupling between the shaft support 72 and the joint interface 74, and between the motor coupler 22 and the joint interface 74 as well. Stated differently, at least part, if not a majority, if not all of the coupling between the shaft support 72 and the joint interface 74, and/or between the motor coupler 22 and the joint interface 74, takes place in a central bore of the bearing 71, between axial planes of faces of the bearing 71.

These axial planes have as their normal the rotational axis of the bearing 71 (aligned with direction X), and include the proximal-most and the distal-most points of the bearing 71.

OPERATION

Now that the various components of the linear actuator 10 have been shown, an operation thereof is set forth.

The operation will refer to the linear actuator 10 as being oriented such that the interface 61 is facing the ground. The interface 61 could also be against a seat or motion platform, for example.

The linear actuator 10 is initially calibrated, in that the position of the sliding tube 60 is known relative to casing 40. This may be done by any appropriate method, including calibration movements when the linear actuator 10 is turned on, as controlled by a platform controller.

The electric motor 20 receives motion signals and will hence produce rotational outputs proportional to the motion signals, in the selected directions—the motor 20 being bi-directional. The rotational outputs will be transmitted through the output shaft 21, to the threaded shaft 70 via the coupling therebetween.

The sliding tube 60 and travelling nut 69 will convert rotations of the threaded shaft 70 into a translation of the sliding tube 60 along the axial direction. As the sliding tube 60 is connected to the ground or a base via the cap 62, the resulting action will be a translational motion of the motor 20 and casing 40 relative to the ground or a base, and possibly other adjustment movements permitted by the joint formed through the cap 62. As the motion platform is connected to the motor 20 or the casing 40, the motion platform will move with the motor 20 and the casing 40. As mentioned above, it is pointed out that additional degrees of freedom may be present between any of ground/base, the motor 20/casing 40, and the sliding tube 60, for instance by the presence of joints between the motion platform, the ground/base and the linear actuator 10.

In instances, the sliding tube 60 is connected to the motion platform while the motor 20 and the casing 40 are secured to the ground or to a base. In such a case, the motion platform will move with the sliding tube 60.

The linear actuator 10 has an important maintenance simplification, in that an integral assembly unit is formed, including the sliding tube 60, the travelling nut 69, the threaded shaft 70, the bearing 71 and the shaft support 72. The integral assembly unit may or may not include the motor 20, the motor coupler 22 and/or the joint interface 74. The integral assembly unit has these components and associated components interconnected to one another so as to be separable as a whole from the casing 40, simply by pulling out the integral assembly (including or not the motor 20) as a whole from the casing 40 via the proximal end. It may be required to disconnect beforehand the sliding tube 60 from joint components such as the cap 62. Therefore, in the event that the linear actuator 10 needs repair or maintenance, some structural components of the linear actuators 10 (e.g., the casing 40 with liner 45) may remain on site for use with a replacement integral assembly unit being used, while the removed integral assembly unit may be taken away. The motor 20 may also readily be separated from the joint interface 74 as there are no fasteners between them. Hence, the motor 20 may remain in use while a remainder of the integral assembly unit is used, or vice versa.

The above-described linear actuator 10 may have only some of the features described above, or combinations of only some of the features above, with the features being present alone or in any combination being, for example, the liner 45, the taper-lock arrangement between the shaft 70 and the shaft support 72, the collar 71A, the low hardness joint interface 74, the location of the distal-half interconnection between travelling nut 69 and sliding tube 60.

The above-described linear actuator 10 may be capable of operating with a load capacity between 340 kg and 408 kg, with a frequency of 0-100 Hz of movements. The amplitude of the stroke may be up to 152 mm for the above-referred load capacity (though it may be up to 140 mm, or between 140 mm and 152 mm). The sliding tube 60 has a diameter of between 74 mm±5 mm and the inner cavity 42 of the casing 40 has a length of about 274 mm±10 mm. Therefore, the linear actuators 10 have such a load capacity and stroke for a ratio of casing length to piston diameter ranging between 3.3 and 4.1.

The invention claimed is:

1. A linear actuator comprising:
   a motor for producing a bi-directional rotational output;
   a casing connected to the motor at a proximal end, the casing having an inner cavity defining a joint surface;
   a shaft within the inner cavity of the casing and actuated by the motor for rotation;
   a sliding tube at least partially in the inner cavity of the casing for moving in translation in an axial direction relative to the casing;
   at least one travelling member connected to the sliding tube assembly for moving with the sliding tube in the axial direction, the travelling member being operatively engaged to the shaft for converting a rotational motion of the shaft into a translation of the sliding tube; and
   a liner between the sliding tube and the joint surface of the inner cavity, an inner surface of the liner defining longitudinal contact surfaces separated by longitudinal grooves, the longitudinal contact surfaces contacting the sliding tube.

2. The linear actuator according to claim 1, wherein the liner has C-shaped cross section.

3. The linear actuator according to claim 1, wherein at least some of the longitudinal contact surfaces apply a biasing force on the sliding tube.

4. The linear actuator according to claim 1, including at least a first set of the longitudinal contact surfaces and a second set of the longitudinal contact surfaces, and wherein, at rest, an inner diameter ID of the liner at the first set of the longitudinal contact surfaces is smaller than an inner diameter ID' of the liner at the second set of the longitudinal contact surfaces, whereby the longitudinal contact surfaces of the first set apply a biasing force on the sliding tube.

5. The linear actuator according to claim 4, wherein the longitudinal contact surfaces of the first set are wider than the longitudinal contact surfaces of the second set.

6. The linear actuator according to claim 1, wherein at least one projecting feature is defined on an outer surface of the liner and is received in a surface depression in the inner cavity for the liner to be blocked from translating along the casing.

7. The linear actuator according to claim 1, wherein at least one projection is defined on an outer surface of the liner and is received in a surface depression in the inner cavity for the liner to be blocked from rotating within the casing.

8. The linear actuator according to claim 7, wherein the at least one projection is an elongated finger, and wherein a guide projects inward from a remainder of the liner for being received in a corresponding slot of the sliding tube for blocking the sliding tube from rotating.

9. The linear actuator according to claim 8, wherein the guide is radially aligned with the at least one projection.

10. The linear actuator according to claim 1, wherein the longitudinal contact surfaces have a coating thereon having a lower friction coefficient than a remainder of the liner.

11. A linear actuator comprising:
a motor for producing a bi-directional rotational output;
a casing connected to the motor at a proximal end, the casing having an inner cavity defining a joint surface;
a shaft within the inner cavity of the casing and actuated by the motor for rotation;
a sliding tube at least partially in the inner cavity of the casing for moving in translation in an axial direction relative to the casing, the sliding tube having a proximal half and a distal half, the proximal half being closer to the motor than the distal half;
at least one travelling member having a connection portion connected to the sliding tube for moving with the sliding tube in the axial direction, the travelling member having an operational portion being operatively engaged to the shaft for converting a rotational motion of the shaft into a translation of the sliding tube, wherein the connection portion of the travelling member is substantially in the distal half of the sliding tube, and the operational portion of the travelling member is substantially in the proximal half of the sliding tube.

12. The linear actuator according to claim 11, wherein the connection portion of the travelling member is in threaded engagement with the sliding tube.

13. The linear actuator according to claim 11, wherein the operational portion of the travelling member is a ball screw unit.

14. The linear actuator according to claim 11, wherein a maximum amplitude of movement of the sliding tube relative to the casing is up between 140 mm and 152 mm.

15. The linear actuator according to claim 11, wherein the inner cavity of the casing has a the inner cavity 42 of the casing 40 has a length of about 274 mm±10 mm.

16. The linear actuator according to claim 11, wherein a ratio of casing length to sliding tube diameter ranges between 3.3 and 4.1.

* * * * *